UNITED STATES PATENT OFFICE.

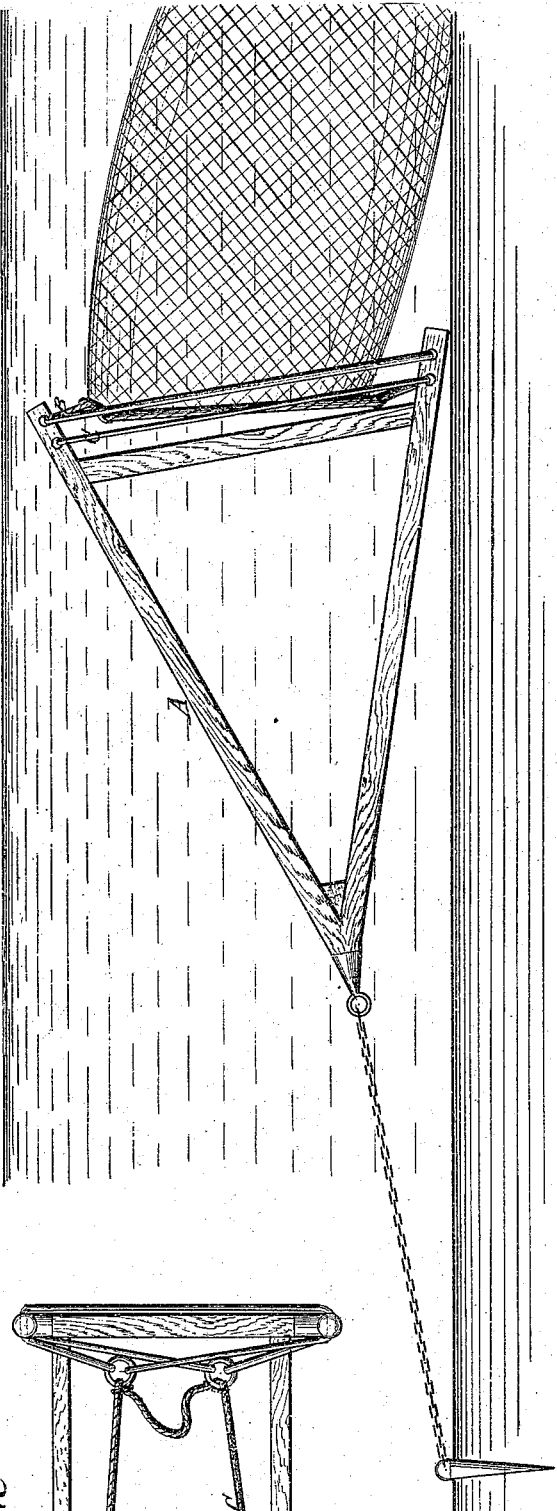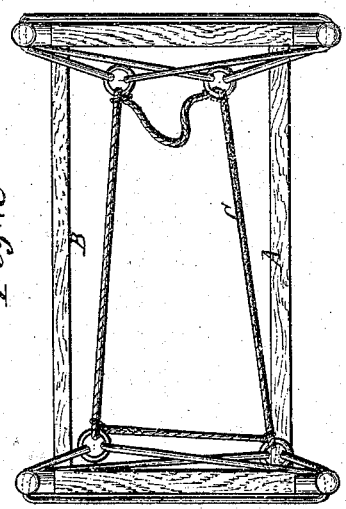

BENJAMIN RYDER, JR., OF SOUTH ORRINGTON, MAINE.

IMPROVEMENT IN FISH-NET SUPPORTERS.

Specification forming part of Letters Patent No. 113,572, dated April 11, 1871.

*To all whom it may concern:*

Be it known that I, BENJAMIN RYDER, Jr., of South Orrington, in the county of Penobscot and State of Maine, have invented a new and useful Improvement in Tide-Nets; and I do hereby declare that the following is a full, clear, and exact description of the same, reference being had to the accompanying drawing, forming a part of this specification.

My invention relates to that class of nets known as tide-nets, and which are chiefly employed, at the present time, under ice and in catching smelt.

My object is to construct the frame and attach the net thereto in a new way, so that it will be automatically adjusted by the tide and be susceptible of use in a tidal stream at any season of the year.

My principle or new way of preparing and operating a tide-net consists in attaching the net to a frame susceptible of horizontal vibration on a fixed pivot, to which it is loosely attached by a chain, and which frame is also so adjusted in its specific gravity as to float when the net is doubled up, but to sink when the net is unrolled by the tide, and made to receive the force of the current upon its inner surface.

In the drawing, B is the rectangular wooden frame, to which the net is attached by cords C; and A is a triangular frame, which is firmly fastened to the net-frame B. The former is fastened loosely by a chain to a stake which has been driven into the bed of the stream. The specific gravity of this frame is regulated by irons or otherwise, and brought into such relation to the force exerted by the current upon the inner surface of the net that, when spread in the direction of its course, it will be readily submerged thereby; but when the tide is changing its current is at its minimum, and, the tension of the net reduced to nothing, the whole device will rise and float.

When the tide changes its course and bears strongly against the net, the latter first swings at right angles to its attaching-ropes and the wood-work; then the entire apparatus is caused to rotate in a semicircle and take its position on the opposite side of the stake. In this manner the net will be automatically adjusted to every change of the tide without ever allowing the fish, which always follow the current, to escape.

Having thus described all that is necessary to a full understanding of my invention, what I esteem to be new, and desire to protect by Letters Patent, is—

A net and net-frame combined, as described, with the triangular frame A, weighted, loosely attached to fixed pivot, and operating as and for the purpose specified.

BENJAMIN RYDER, JR.

Witnesses:
ALBERT N. SMITH,
HORACE J. NICKERSON.